US008626202B2

(12) United States Patent
Shiotsu et al.

(10) Patent No.: US 8,626,202 B2
(45) Date of Patent: Jan. 7, 2014

(54) INFORMATION PROCESSING APPARATUS, CORRECTION METHOD, AND RECORDING MEDIUM

(75) Inventors: Shinichi Shiotsu, Kawasaki (JP); Hiroyasu Sugano, Kita (JP); Hideki Tanaka, Kawasaki (JP); Daisuke Yamashita, Kawasaki (JP); Koichi Yokota, Yokohama (JP); Akira Itasaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 13/432,402

(22) Filed: Mar. 28, 2012

(65) Prior Publication Data
US 2012/0252502 A1 Oct. 4, 2012

(30) Foreign Application Priority Data

Mar. 30, 2011 (JP) ................................. 2011-076195

(51) Int. Cl.
H04W 4/02 (2009.01)
(52) U.S. Cl.
USPC ..................... 455/457; 455/456.1; 455/456.2; 455/456.5; 455/456.6
(58) Field of Classification Search
USPC ........ 455/456.1–456.6, 457, 404.2, 436, 439, 455/515
See application file for complete search history.

(56) References Cited

U.S. PATENT DOCUMENTS

| 2004/0203904 | A1  | 10/2004 | Gwon et al. |
| 2008/0189970 | A1* | 8/2008  | Wang et al. ..................... 33/701 |
| 2009/0098903 | A1* | 4/2009  | Donaldson et al. ......... 455/552.1 |
| 2009/0131124 | A1* | 5/2009  | Bibaud et al. .............. 455/575.2 |
| 2010/0323719 | A1* | 12/2010 | Jen .............................. 455/456.1 |
| 2011/0244901 | A1* | 10/2011 | Sugahara ....................... 455/501 |
| 2012/0169543 | A1* | 7/2012  | Sharma et al. ................ 342/458 |
| 2012/0257657 | A1* | 10/2012 | Subrahmanya et al. ...... 375/222 |
| 2013/0012183 | A1* | 1/2013  | Jin et al. ........................ 455/418 |

FOREIGN PATENT DOCUMENTS

| JP | 2004-179995 | 6/2004 |
| JP | 2004-215258 | 7/2004 |
| JP | 2009-200926 | 9/2009 |
| JP | 2009-250661 | 10/2009 |
| JP | 2010-175374 | 8/2010 |
| JP | 2010-223593 | 10/2010 |

* cited by examiner

Primary Examiner — Nathan Mitchell
Assistant Examiner — Dung Lam
(74) Attorney, Agent, or Firm — Staas & Halsey LLP

(57) ABSTRACT

An information processing apparatus that conducts positioning on the basis of received signal strength indications obtained from access points, includes, a contact information detector that detects contact information between the information processing apparatus and a dielectric body, a recording module that stores a gain table including gain data corresponding to obtained contact information, a gain data correcting unit that extracts the gain data corresponding to the contact information obtained by the contact information detector from the gain table of the recording module and corrects gain by using the extracted gain data, and a positioning module that conducts the positioning by using the gain obtained by the correcting unit and the received signal strength indications.

17 Claims, 13 Drawing Sheets

FIG. 6

| SENSOR INFORMATION | STATE OF NOTHING NEARBY (DEFAULT) | IN HAND | SHIRT POCKET | | TELEPHONY |
|---|---|---|---|---|---|
| | | | LCD FACING BODY | BACK FACING BODY | |
| BACK CAPACITIVE SENSOR | SMALL | LARGE | SMALL | LARGE | LARGE |
| FRONT CAPACITIVE SENSOR | SMALL | SMALL | LARGE | SMALL | LARGE |
| LCD SCREEN ON/OFF INFORMATION | ON/OFF | ON | OFF | OFF | ON |

FIG. 7

| BODY CONTACT SURFACE INFORMATION | BODY CONTACT LEVEL INFORMATION | GAIN DATA |
|---|---|---|
| BACK | SMALL | G_b_s |
|  | MEDIUM | G_b_m |
|  | LARGE | G_b_l |
| FRONT (LCD) | SMALL | G_f_s |
|  | MEDIUM | G_f_m |
|  | LARGE | G_f_l |

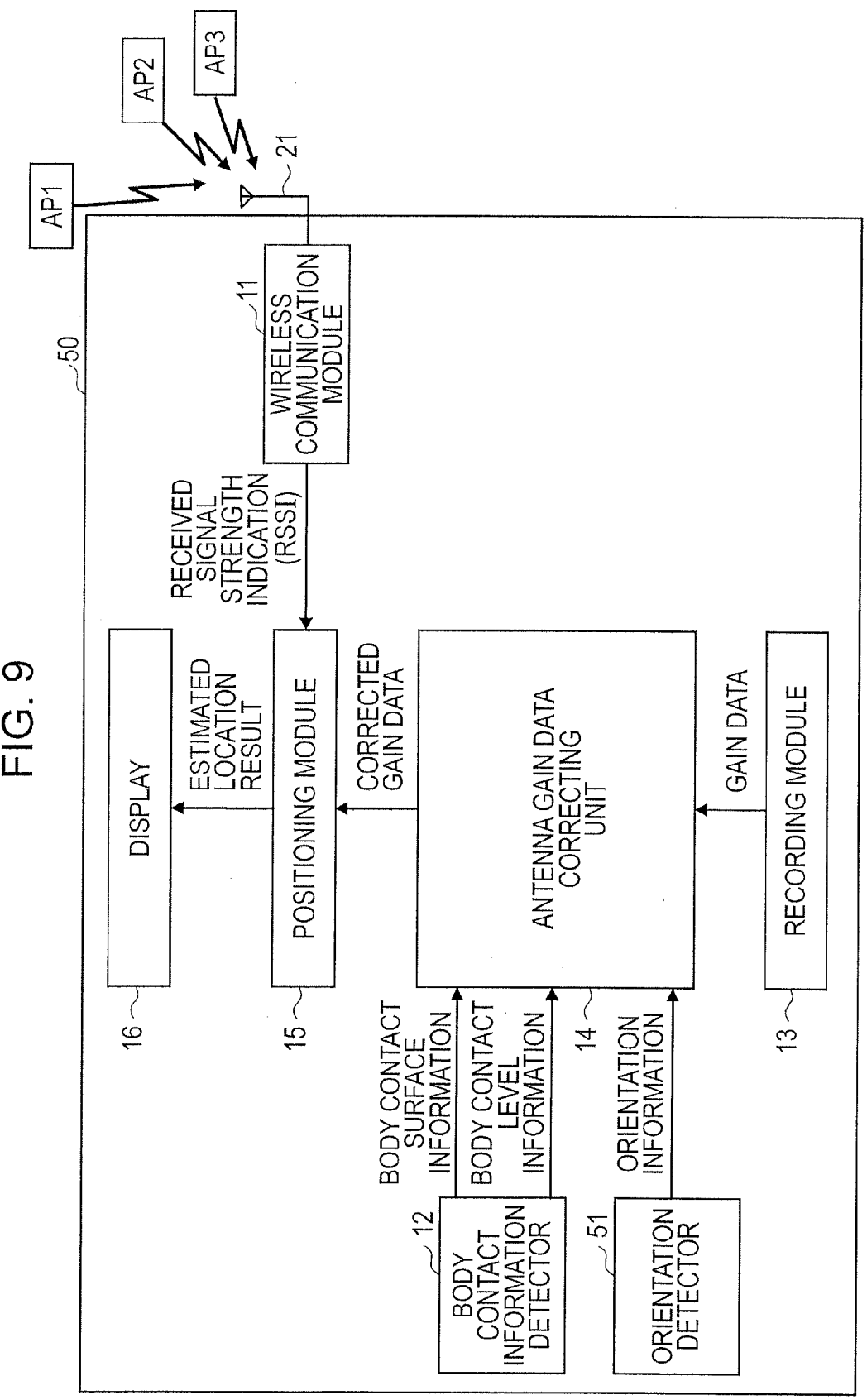

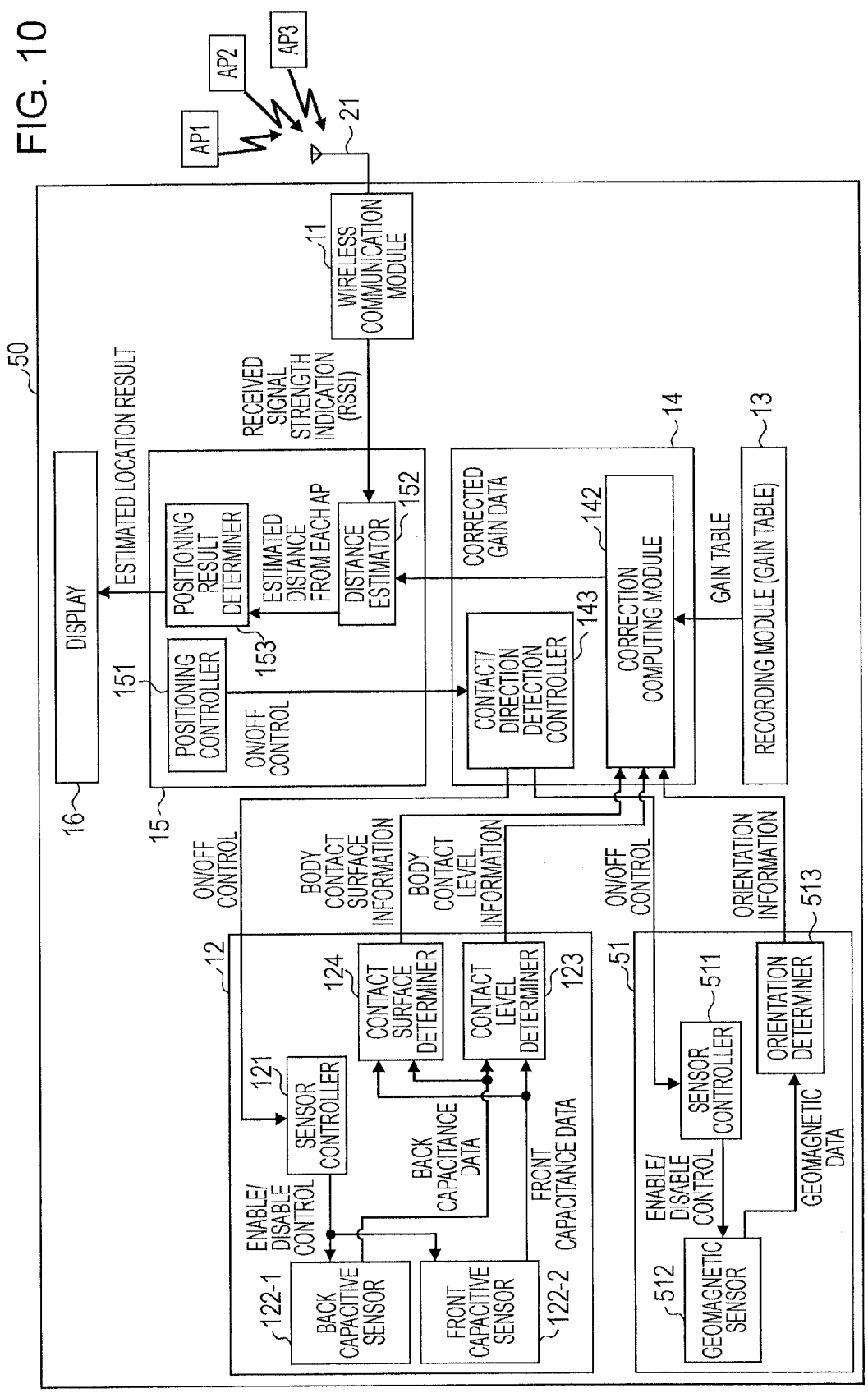

| ANGLE | BODY CONTACT SURFACE INFORMATION | BODY CONTACT LEVEL INFORMATION | GAIN DATA |
|---|---|---|---|
| 0° | BACK | SMALL | G_0_b_s |
| | | MEDIUM | G_0_b_m |
| | | LARGE | G_0_b_l |
| | FRONT (LCD) | SMALL | G_0_f_s |
| | | MEDIUM | G_0_f_m |
| | | LARGE | G_0_f_l |
| 1° | BACK | SMALL | G_1_b_s |
| | | MEDIUM | G_1_b_m |
| | | LARGE | G_1_b_l |
| | FRONT (LCD) | SMALL | G_1_f_s |
| | | MEDIUM | G_1_f_m |
| | | LARGE | G_1_f_l |
| ... | ... | ... | ... |
| 359° | BACK | SMALL | G_359_b_s |
| | | MEDIUM | G_359_b_m |
| | | LARGE | G_359_b_l |
| | FRONT (LCD) | SMALL | G_359_f_s |
| | | MEDIUM | G_359_f_m |
| | | LARGE | G_359_f_l |

| ANGLE | BODY CONTACT SURFACE INFORMATION | BODY CONTACT LEVEL INFORMATION | GAIN DATA |
|---|---|---|---|
| 0° | FRONT (LCD) | LARGE | G_315_f_1 |
| 1° | FRONT (LCD) | LARGE | G_316_f_1 |
| n | ... | ... | G_(n−45)_f_1 |
| 359° | FRONT (LCD) | LARGE | G_314_f_1 |

INFORMATION PROCESSING APPARATUS, CORRECTION METHOD, AND RECORDING MEDIUM

CROSS-REFERENCE TO RELATED APPLICATION(S)

This application is based upon and claims the benefit of priority of the prior Japanese Patent Application No. 2011-76195, filed on Mar. 30, 2011, the entire contents of which are incorporated herein by reference.

FIELD

The embodiments discussed herein are related to an information processing apparatus, a correction method, and a recording medium for correcting positioning using received signal strength indications.

BACKGROUND

In the related art, there exist positioning systems using received signal strength indications (RSSIs). Technology is known in which, when positioning, radio waves from three access points, for example, are received by a device to acquire RSSIs, and a location is estimated by trilateration on the basis of the acquired RSSIs.

Also, in the related art, there exists technology in which antennas are respectively disposed at one part and another part of the chassis such that high antenna emission characteristics are ensured irrespective of which part of the device the user is holding, and technology that calculates several provisional predicted locations by using the multiple calculation methods of triangulation, k-nearest neighbor, and minimum-perimeter polygon algorithms (see Japanese Laid-open Patent Publication No. 2004-179995 and Japanese Laid-open Patent Publication No. 2004-215258, for example).

Also, in the related art, there exists technology in which many radio tags are dispersed and which estimates the present location of a mobile device subjected to positioning by communicating with a plurality of radio tags, and technology that monitors communication conditions with a wireless base station, and in the case of detecting irregular interference, uses the variation in communication conditions to estimate the distance between a device and a wireless base station in a state without interference (see Japanese Laid-open Patent Publication No. 2010-175374 and Japanese Laid-open Patent Publication No. 2009-200926, for example).

Furthermore, in the related art, technology is known in which the propagation delay time and received signal strength indication of a wireless signal is computed and which detects the presence of any moving bodies between a base station device and a rangefinder device or another base station device. Technology is also known in which a body's orientation is determined according to a match or mismatch of antenna polarizations (see Japanese Laid-open Patent Publication No. 2010-223593 and Japanese Laid-open Patent Publication No. 2009-250661, for example).

Meanwhile, in the case of conducting trilateration, more suitable trilateration may not be achieved because of variations in received signal strength indication due to how a device or other information processing apparatus is held. Herein, the received signal strength indication (RSSI) from an access point to a device separated by a communication distance d may be computed with the following Equation (1).

$$RSSI = P_{tx} + G_{tx} - Loss\_d + G_{rx} \quad (1)$$

In Equation (1) above, Ptx represents the transmitting power of the access point, Gtx represents the transmitting antenna gain of the access point, Loss_d represents the spatial loss over the communication distance d, and Grx represents the receiving antenna gain at the device. Also, the transmitting power Ptx and the transmitting antenna gain Gtx are parameters specific to the access point, the spatial loss Loss_d is a parameter determined by the distance, and the receiving antenna gain Grx is a parameter specific to the device (information processing apparatus).

In other words, by acquiring an RSSI, the device substitutes the acquired RSSI, the transmitting power Ptx, the transmitting antenna gain Gtx, and the receiving antenna gain Grx into the above Equation (1) to compute the spatial loss Loss_d. The device also acquires the distance to that access point according to the value of the computed spatial loss Loss_d. The device also conducts positioning of the device itself by acquiring the distance as above from three different access points.

However, the receiving antenna gain Grx described above varies according to factors such as the level of contact with a body or other dielectric body, for example. As the receive antenna included in the device nears a body, its antenna gain (directionality, etc.) worsens. Antenna gain also varies according to the level of contact with a body, worsening as the level of contact increases. Furthermore, a suitable distance may not be produced if the antenna gain is distorted.

Japanese Laid-open Patent Publication Nos. 2004-179995, 2004-215258, 2010-175374, 2009-200926, 2010-223593, and 2009-250661 are examples of related arts.

SUMMARY

According to an aspect of the invention, an information processing apparatus that conducts positioning on the basis of received signal strength indications obtained from access points, includes, a contact information detector that detects contact information between the information processing apparatus and a dielectric body, a recording module that stores a gain table including gain data corresponding to obtained contact information, a gain data correcting unit that extracts the gain data corresponding to the contact information obtained by the contact information detector from the gain table of the recording module and corrects gain by using the extracted gain data, and a positioning module that conducts the positioning by using the gain obtained by the correcting unit and the received signal strength indications.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram for explaining a contact level determining method;

FIG. 7 is a diagram illustrating an exemplary gain table in accordance with Embodiment 2;

FIG. 9 illustrates an exemplary schematic configuration of an information processing apparatus in accordance with Embodiment 3;

FIG. 10 illustrates an exemplary block configuration of an information processing apparatus in accordance with Embodiment 3;

DESCRIPTION OF EMBODIMENTS

Hereinafter, embodiments will be described in detail with reference to the attached drawings. The information processing apparatus indicated hereinafter may be a mobile phone, a personal digital assistant (PDA), a notebook computer, an e-book reader, a music playback apparatus, a game console, a point of sale (POS) terminal, or a radio, for example. Also, although a human body is used as an example of a dielectric body in the embodiments indicated hereinafter, a dielectric body is not limited thereto.

Embodiment 1

Figure 1:
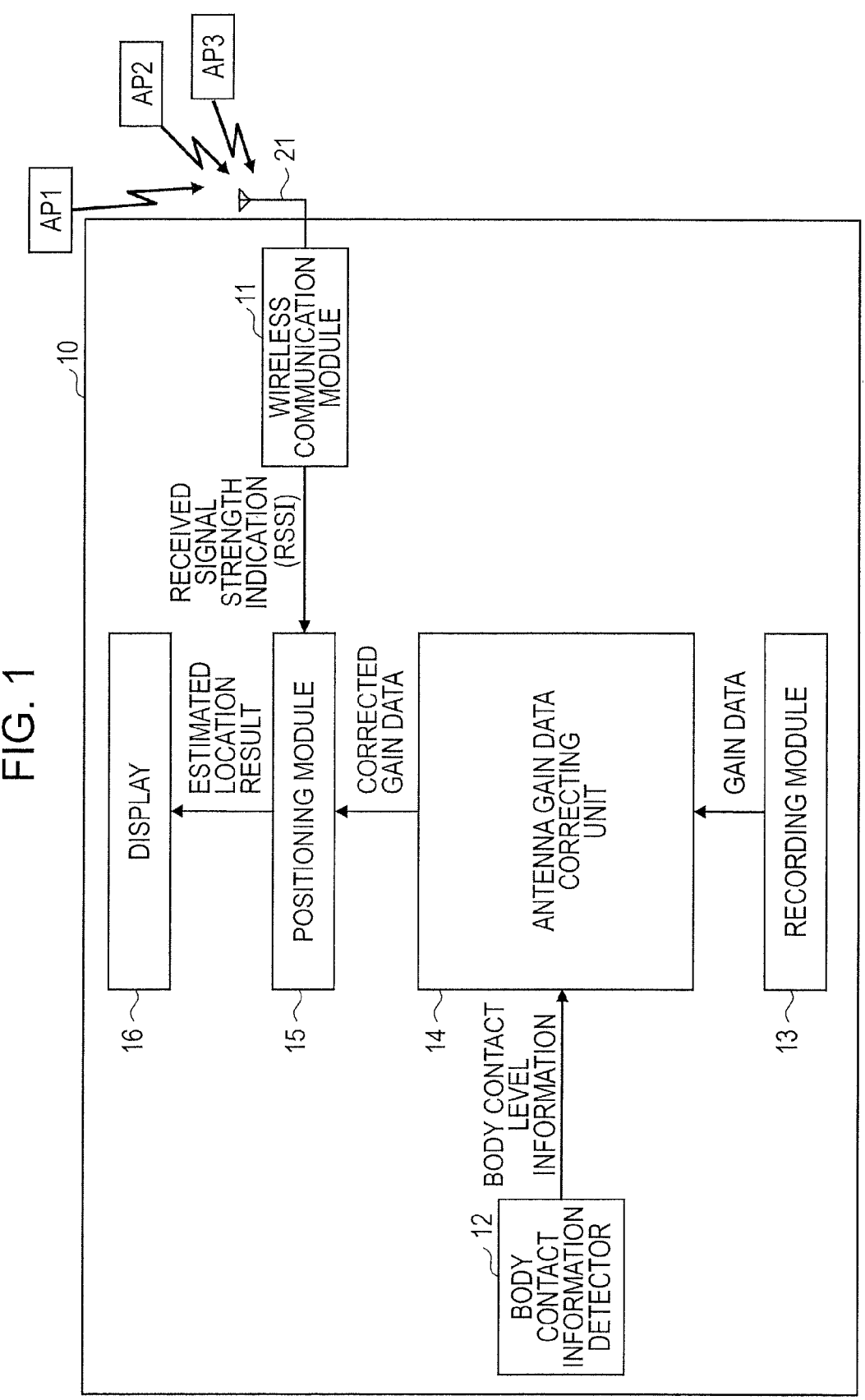
FIG. 1 illustrates an exemplary schematic configuration of an information processing apparatus in accordance with Embodiment 1.

FIG. 1 illustrates an exemplary schematic configuration of an information processing apparatus in Embodiment 1. The information processing apparatus 10 illustrated in FIG. 1 includes a wireless communication module 11, a body contact information detector 12, a recording module 13, an antenna gain data correcting unit 14, a positioning module 15, and a display 16.

The wireless communication module 11 receives signals from access points (hereinafter designated APs) 1 to 3, for example, with a receive antenna 21, and acquires received signal strength indications. The wireless communication module 11 also outputs the acquired received signal strength indications to the positioning module 15.

The body contact information detector 12 detects contact level information on the degree to which the information processing apparatus 10 and a body are in contact, for example.

The recording module 13 records various data used to correct receive antenna gain in Embodiment 1. Specifically, the recording module 13 records gain correction data corresponding to contact level information, etc. detected by the body contact information detector 12.

The recording module 13 also records the parameters in Equation (1) discussed earlier, for example. Specifically, the recording module 13 records various data such as RSSIs, parameters specific to each access point (the transmitting power Ptx and the transmitting antenna gain Gtx, for example), one or more parameters determined by distance (the spatial loss Loss_d, for example), and one or more parameters specific to the device (the uncorrected receiving antenna gain Grx, for example).

The antenna gain data correcting unit 14 corrects one or more parameters specific to the information processing apparatus 10 on the basis of gain data, etc. obtained from the recording module 13, such as body contact level information obtained from the body contact information detector 12. Herein, the parameter to be corrected is the antenna gain data, for example. The antenna gain data correcting unit 14 also outputs corrected antenna gain data to the positioning module 15.

The positioning module 15 conducts trilateration on the basis of corrected gain data obtained from the antenna gain data correcting unit 14 and respective received signal strength indications from AP1 to AP3 obtained from the wireless communication module 11. The positioning module 15 also outputs an estimated location result to the display 16 as a positioning result.

The display 16 displays an estimated location result for the information processing apparatus 10 obtained by using RSSIs obtained from the positioning module 15 on a display screen such as a liquid crystal display (LCD), for example. The display 16 is also able to display operable screens for executing functions of the information processing apparatus 10, and to display various information recorded in the recording module 13.

However, in Embodiment 1, the above recording module 13 may also be provided inside the antenna gain data correcting unit 14.

In other words, when positioning using received signal strength indications from AP1 to AP3 in Embodiment 1, more suitable positioning can be realized by detecting contact information for the information processing apparatus 10 and a body and by using gain data corresponding to the detected contact information as well as the above received signal strength indications.

Exemplary Block Configuration in Embodiment 1

Figure 2:
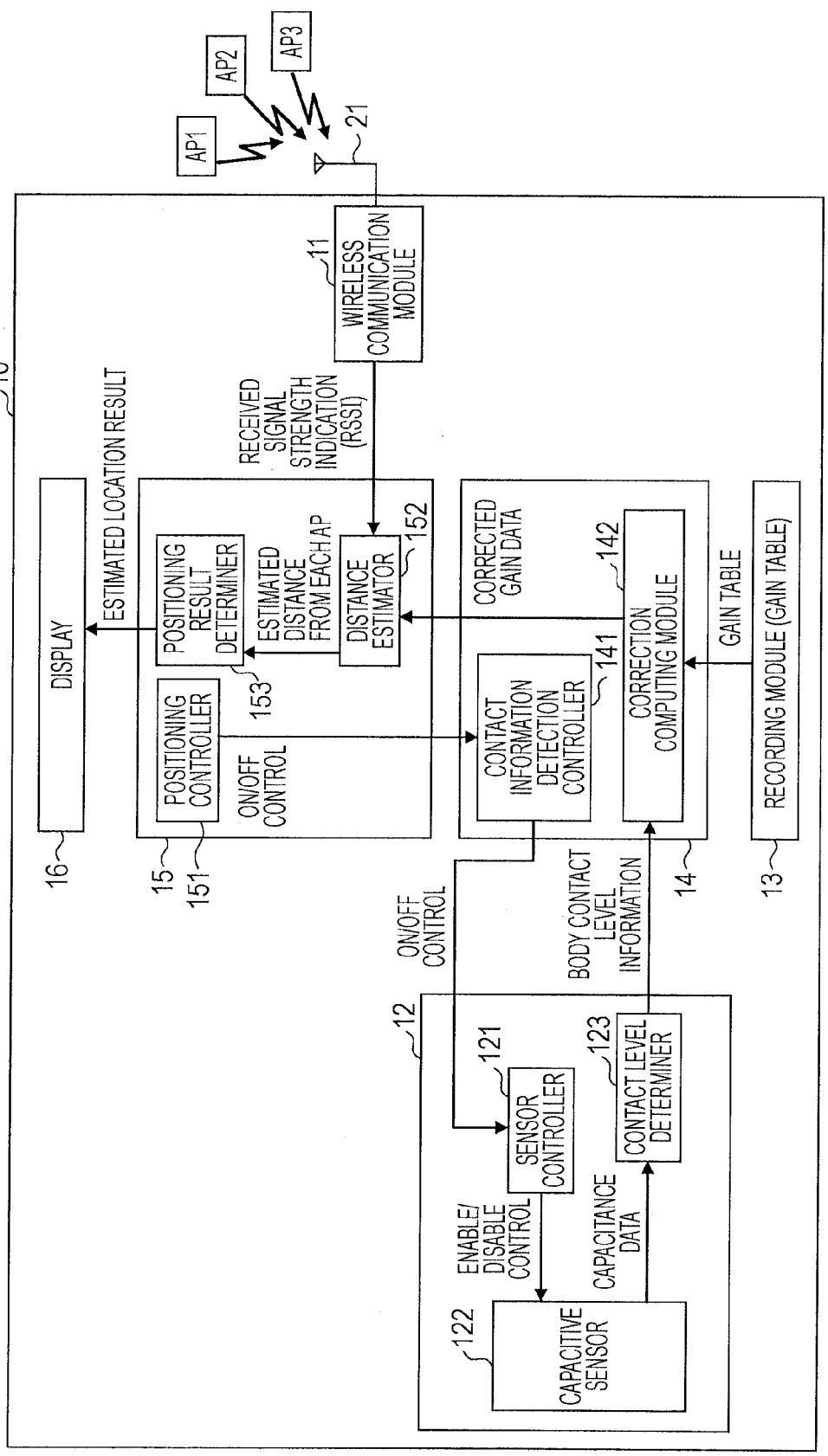
FIG. 2 illustrates an exemplary block configuration of an information processing apparatus in accordance with Embodiment 1.

Next, an exemplary block configuration in Embodiment 1 will be described using the drawings. FIG. 2 illustrates an exemplary block configuration of an information processing apparatus in Embodiment 1. In the exemplary block configuration illustrated in FIG. 2, specific block configurations are illustrated for the body contact information detector 12, the antenna gain data correcting unit 14, and the positioning module 15 in the information processing apparatus 10 illustrated in FIG. 1 discussed above.

The body contact information detector 12 includes a sensor controller 121, one or more capacitive sensors 122, and a contact level determiner 123. Also, the antenna gain data correcting unit 14 includes a contact information detection controller 141 and a correction computing module 142. Also, the positioning module 15 includes a positioning controller 151, a distance estimator 152, and a positioning result determiner 153.

The sensor controller 121 in the body contact information detector 12 controls the switching on/off of the one or more capacitive sensors 122 on the basis of a control signal (Enable/Disable, for example) from the contact information detection controller 141 in the antenna gain data correcting unit 14.

The one or more capacitive sensors 122 acquire surrounding capacitance data on the basis of a control signal from the sensor controller 121. The one or more capacitive sensors 122 also output acquired capacitance data to the contact level determiner 123.

The contact level determiner 123 determines a contact level from the capacitance data obtained from the one or more capacitive sensors 122, and outputs the determined body contact level information to the correction computing module 142 of the antenna gain data correcting unit 14. Herein, a contact level is determined in accordance with the magnitude of the surrounding capacitances obtained by capacitive sensors, for example. Specifically, the contact level is determined to be large in the case of large capacitance, and the contact level is determined to be small in the case of small capacitance.

The contact information detection controller 141 in the antenna gain data correcting unit 14 outputs an on/off control signal to the sensor controller 121 on the basis of an on/off control signal from the positioning controller 151 in the positioning module 15. Specifically, the contact information detection controller 141 switches on the sensor controller 121 at timings when detection of body contact information is appropriate, and then switches off the sensor controller 121 after detecting body contact information, for example.

The correction computing module 142 references a gain table recorded in the recording module 13 and computes gain data correction on the basis of body contact level information obtained from the contact level determiner 123. Specific details of correction computation are discussed later. The correction computing module 142 also outputs corrected gain data to the distance estimator 152 in the positioning module 15.

The positioning controller 151 in the positioning module 15 controls the switching on/off of the contact information detection controller 141. Specifically, the positioning controller 151 switches on the contact information detection controller 141 at timings for executing a positioning process, for example. Also, the positioning controller 151 switches off the contact information detection controller 141 when processing in the positioning result determiner 153 ends, for example.

The distance estimator 152 estimates the distances from AP1 to AP3 on the basis of received signal strength indications (RSSIs) from AP1 to AP3 obtained from the wireless communication module 11. In this case, the distance estimator 152 estimates distance by adjusting the received signal strength indication (RSSI) on the basis of corrected gain data obtained from the correction computing module 142. The distance estimator 152 also outputs estimated results for the distances from AP1 to AP3 to the positioning result determiner 153.

The positioning result determiner 153 conducts positioning on the basis of estimated results for the distances from AP1 to AP3. Herein, location information is position information (such as latitude/longitude information or 3D coordinates, for example) obtained by acquiring the distance from each AP from the received signal strength indications from AP1 to AP3 and conducting positioning on the basis of the acquired information, for example. The positioning result determiner 153 also outputs a positioning result to the display 16 for display on the screen of the display 16.

Positioning Technique of Positioning Module 15 in Embodiment 1

A positioning technique of the positioning module 15 in Embodiment 1 will now be specifically described. In Embodiment 1, trilateration using AP1 to AP3 is conducted as an example. First, radio waves from AP1 to AP3 are received by the information processing apparatus 10 and RSSIs are acquired. Next, corrected receiving antenna gain data Grx for each AP1 to AP3 is extracted from the corrected gain data computed by the correction computing module discussed above. Also, the distance d from each AP1 to AP3 is computed from the above Equation (1). In other words, in Embodiment 1, by computing the spatial loss Loss_d in the above Equation (1), respective distances d corresponding to the spatial loss Loss_d of each AP are acquired. Herein, Ptx and Gtx in the above Equation (1) are calculated using predetermined, fixed values. Furthermore, in Embodiment 1, location is estimated by trilateration based on distances d from each AP1 to AP3 computed above.

Processing Sequence in Embodiment 1

Figure 3:
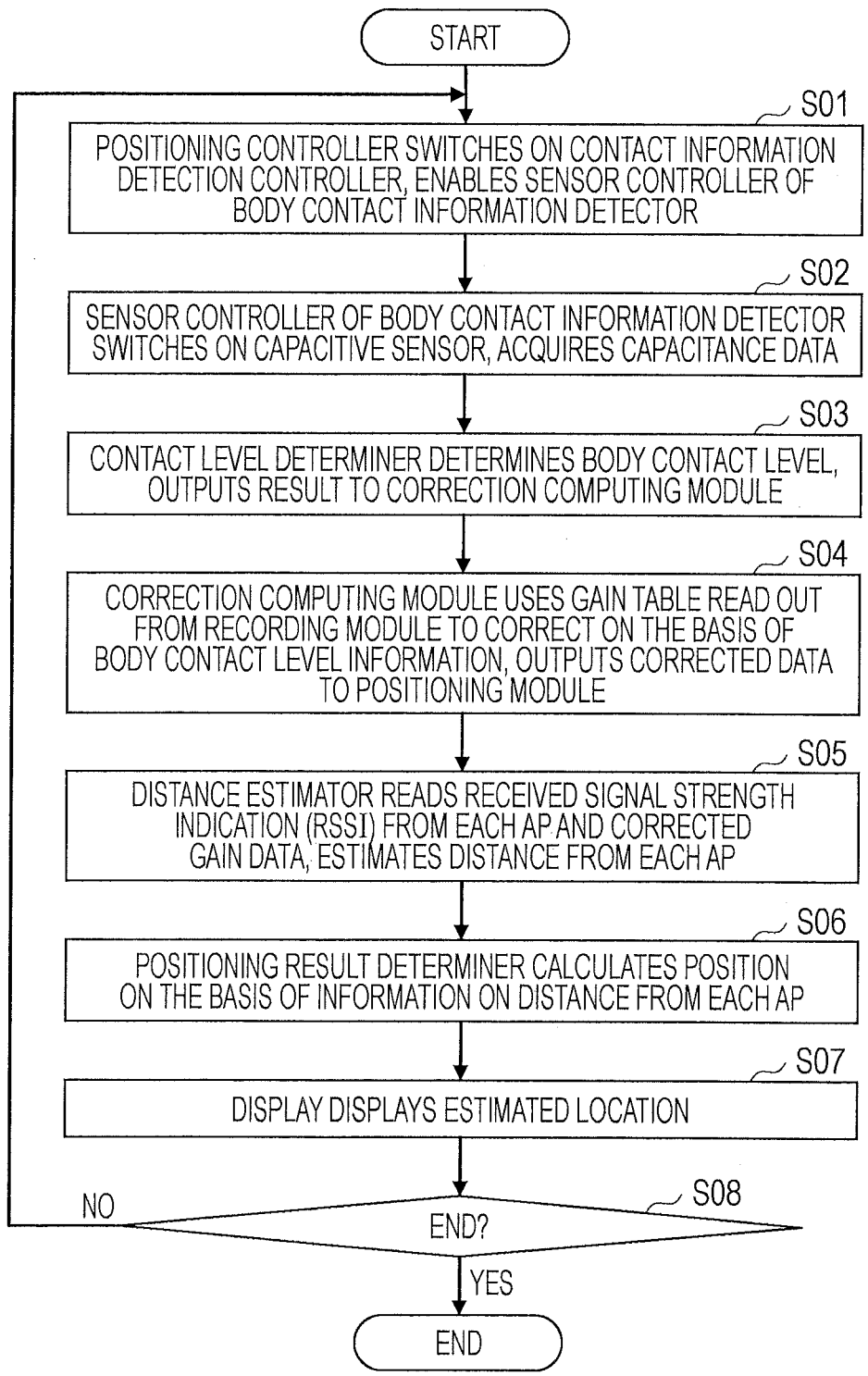
FIG. 3 is a flowchart illustrating an exemplary positioning correction processing sequence in accordance with Embodiment 1.

A correction processing sequence in Embodiment 1 will now be specifically described using a flowchart. FIG. 3 is a flowchart illustrating an exemplary positioning correction processing sequence in Embodiment 1. The flowchart illustrated in FIG. 3 is an illustration of an example where one capacitive sensor is used to conduct correction by contact level determination.

In FIG. 3, first the positioning controller 151 switches on the contact information detection controller 141 to enable the sensor controller 121 of the body contact information detector 12 and cause a body contact detection process to be executed (operation S01). Next, the sensor controller 121 of the body contact information detector 12 switches on the capacitive sensor 122 and acquires capacitance data (operation S02).

Next, a body contact level is determined by the contact level determiner 123 on the basis of capacitance data obtained from the processing in operation S02, and the result is output to the correction computing module 142 (operation S03).

Next, the correction computing module 142 reads out a gain table recorded in the recording module 13 on the basis of body contact level information, corrects gain data using the gain table thus read out, and outputs corrected gain data to the positioning module 15 (operation S04).

Next, the distance estimator 152 reads in received signal strength indications (RSSIs) from AP1 to AP3 and the corrected gain data, and estimates the distance from each AP1 to AP3 (operation S05).

Next, the positioning result determiner 153 calculates the location of the information processing apparatus 10 on the basis of distance information corresponding to each AP1 to AP3 (operation S06), and displays the calculated results on a display (operation S07).

At this point, the positioning controller 151 determines whether or not to end the correction positioning process in Embodiment 1 (operation S08), returning to S01 and repeating the processing thereafter in the case of not ending the process (operation S08—No). Meanwhile, the positioning controller 151 ends the positioning correction process in Embodiment 1 in the case of ending the process in the processing of S08 (operation S08—Yes).

Specific Example Regarding Contact Level Information

Figure 4:
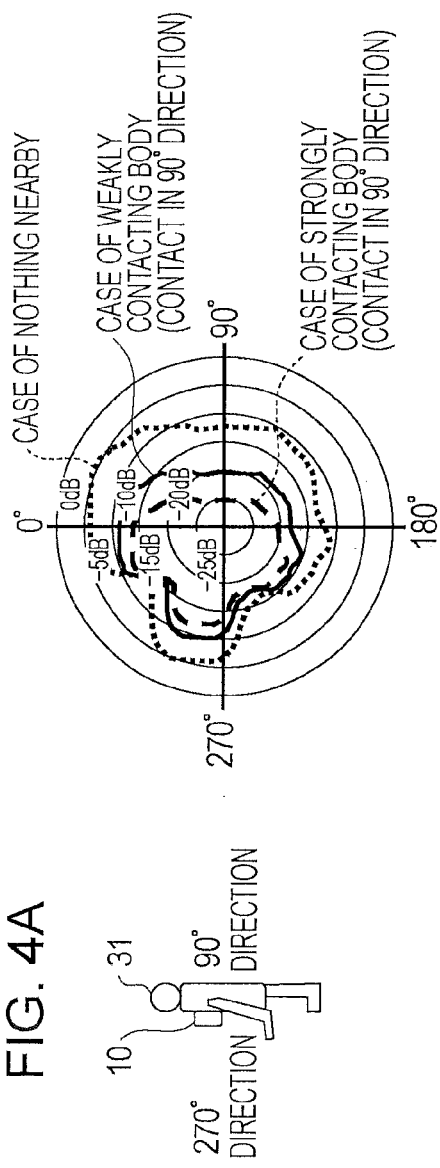
FIGS. 4A-4C are diagrams for explaining the relationship between contact level information and a gain table in accordance with Embodiment 1.

Next, the relationship between contact level information and a gain table according to Embodiment 1 discussed above will be specifically described using a drawing. FIGS. 4A-4C are diagrams for explaining the relationship between contact level information and a gain table in Embodiment 1. Herein, FIG. 4A illustrates a state of contact with a body (i.e., a dielectric body), FIG. 4B illustrates relationships between contact levels and antenna gain directionality data, and FIG. 4C illustrates an example of the gain table discussed earlier. In Embodiment 1, an information processing apparatus 10 touching a body 31 has an increasingly large contact level as the contact surface with the body becomes stronger. For example, in the case of nothing nearby (the case of a "small"

contact level), the receive sensitivity is high, whereas in the case where the body 31 is lightly touching the information processing apparatus 10 (the case of a "medium" contact level), the receive sensitivity weakens in the direction that is blocked by the person. In the case where the body is strongly touching (the case of a "large" contact level), the effect of being blocked by the person increases further and the receive sensitivity weakens further.

Consequently, in such cases, gain data corresponding to different contact levels is acquired from the gain table illustrated in FIG. 4C, and the receiving antenna gain is corrected using the acquired gain data.

With the contact level determination herein, a measured value detected by the one or more capacitive sensors 122 in the body contact information detector 12 discussed earlier, for example, is used to determine to one contact level from among "large", "medium", and "small" according to respectively measured capacitances under various carrying conditions, such as when the hand of the of the body 31 is touching the information processing apparatus 10 directly, when the information processing apparatus 10 is being stored inside the shirt pocket of a dress shirt being worn by the body 31, or when the information processing apparatus 10 has been placed on a tabletop away from the body 31, for example. Additionally, the capacitance ranges respectively corresponding to "large", "medium", and "small" may be preset, or set capacitance ranges may be modified according to certain conditions. Also, the discrimination of contact levels is not limited to the above three ("large", "medium", "small"), as long as discrimination is made between at least two contact levels.

Embodiment 2

Figure 5:
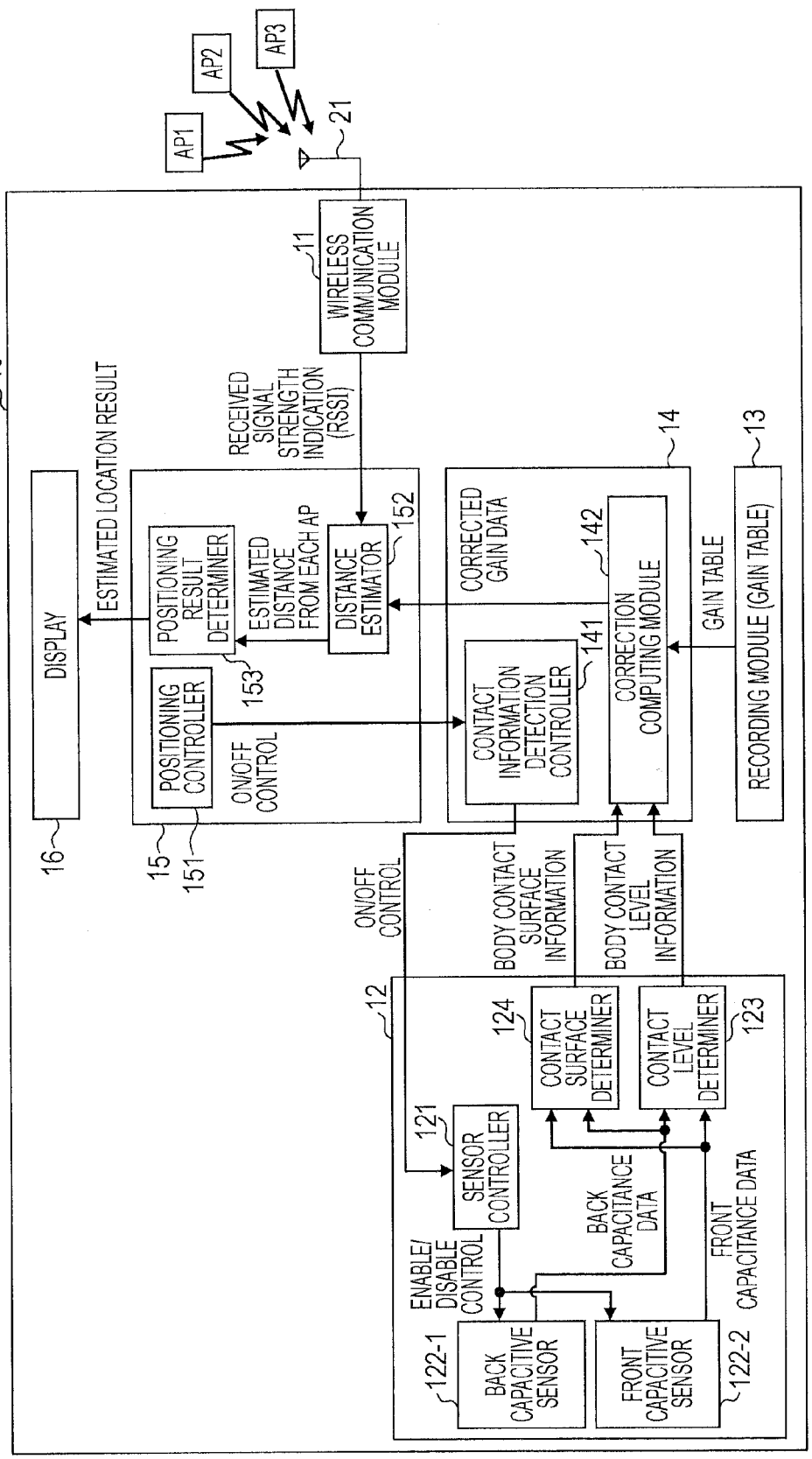
FIG. 5 illustrates an exemplary block configuration of an information processing apparatus in accordance with Embodiment 2.

Next, Embodiment 2 will be described. FIG. 5 illustrates an exemplary block configuration of an information processing apparatus in Embodiment 2. In Embodiment 2 indicated hereinafter, like reference symbols are given to like elements from Embodiment 1, and detailed description thereof is reduced or omitted.

The information processing apparatus 40 illustrated in FIG. 5 includes a wireless communication module 11, a body contact information detector 12, a recording module 13, an antenna gain data correcting unit 14, a positioning module 15, and a display 16. However, the above recording module 13 may also be provided inside the antenna gain data correcting unit 14.

The body contact information detector 12 includes a sensor controller 121, a back capacitive sensor 122-1, a front capacitive sensor 122-2, a contact level determiner 123, and a contact surface determiner 124. Also, the antenna gain data correcting unit 14 includes a contact information detection controller 141 and a correction computing module 142. Also, the positioning module 15 includes a positioning controller 151, a distance estimator 152, and a positioning result determiner 153.

In other words, compared to Embodiment 1, Embodiment 2 includes a plurality of capacitive sensors (two in the example of FIG. 5) and a contact surface determiner 124 in the body contact information detector 12.

Consequently, the sensor controller 121 in the body contact information detector 12 controls the switching on/off of the back capacitive sensor 122-1 and the front capacitive sensor 122-2 on the basis of a control signal (Enable/Disable, for example) from the contact information detection controller 141 in the antenna gain data correcting unit 14.

However, the sensor controller 121 may also use either the back capacitive sensor 122-1 or the front capacitive sensor 122-2, and is able to switch one of the capacitive sensors on/off in that case.

Herein, the plurality of capacitive sensors 122 are provided at distance positions on the information processing apparatus 40 (on the front and back in the example in FIG. 5). However, in Embodiment 2, the locations of the plurality of capacitive sensors 122 are not limited to the front and back, and may also be provided on the sides, for example, or provided in at least two places from among the front, the back, and the sides. Furthermore, in Embodiment 2, the front surface is taken to be a liquid crystal surface (the display surface of the display 16) as an example.

In this way, in Embodiment 2, capacitance can be more suitably acquired in different directions of the information processing apparatus 40. Thus, according to the present embodiment, positioning correction can be more suitably conducted.

The back capacitive sensor 122-1 and the front capacitive sensor 122-2 respectively acquire surrounding capacitance data on the basis of a control signal from the sensor controller 121. The back capacitive sensor 122-1 and the front capacitive sensor 122-2 also output their respectively acquired back capacitance data and front capacitance data to the contact level determiner 123 and the contact surface determiner 124.

The contact level determiner 123 determines a contact level from the back capacitance data and front capacitance data obtained from the back capacitive sensor 122-1 and the front capacitive sensor 122-2. The contact level determiner 123 also outputs the determined body contact level information to the correction computing module 142 in the antenna gain data correcting unit 14.

The contact surface determiner 124 determines which surface of the information processing apparatus 10 is contacting a body, on the basis of the magnitudes of the back capacitance data and front capacitance data obtained from the back capacitive sensor 122-1 and the front capacitive sensor 122-2. In other words, in Embodiment 2, the capacitance from the capacitive sensor provided on the surface facing a body has a greater value than the capacitance from the other capacitive sensor. For this reason, the contact surface determiner 124 determines the surface upon which is provided the capacitive sensor that acquire the larger capacitance value as the body contact surface. The contact surface determiner 124 also outputs the determined contact surface information to the correction computing module 142.

Also, in Embodiment 2, the correction computing module 142 extracts a gain table from the recording module 13 in order to compute correction. At this point, the correction computing module 142 acquires gain data for back and front body contact levels, and computes contact surface correction and contact level correction in accordance with that gain data.

Contact Level Determining Method in Embodiment 2

A contact level determining method in Embodiment 2 will now be described using a drawing. FIG. 6 is a diagram for explaining a contact level determining method. In the example in FIG. 6, the way an information processing apparatus is held can be determined on the basis of device front and back capacitive sensors and LCD on/off information. Herein, in the case where the back capacitive sensor 122-1 and the front capacitive sensor 122-2 are both "small", it can be determined that nothing is near the information processing apparatus, whether the LCD is on or off. Also, in the case where the back capacitive sensor 122-1 is "large", the front capacitive sensor 122-2 is "small", and the LCD is on, it can be determined that the information processing apparatus is in hand.

Also, in the case where the back capacitive sensor 122-1 is "small", the front capacitive sensor 122-2 is "large", and the LCD is off, it can be determined that the information processing apparatus is being stored in a shirt pocket with the LCD facing the body.

Also, in the case where the back capacitive sensor 122-1 is "large", the front capacitive sensor 122-2 is "small", and the LCD is off, it can be determined that the information processing apparatus is being stored in a shirt pocket with the back facing the body.

Furthermore, in the case where the back capacitive sensor 122-1 and the front capacitive sensor 122-2 are both "large" and the LCD is on, it can be determined that a telephone call is taking place. By determining the current usage state of the information processing apparatus in this way, positioning can be corrected more accurately.

Exemplary Gain Table in Embodiment 2

FIG. 7 is a diagram illustrating an exemplary gain table in Embodiment 2. The gain table illustrated in FIG. 7 includes the items "Body contact surface information", "Body contact level information", and "Gain data" as an example, but is not limited thereto.

With the body contact surface information, information on the back or front is acquired, for example. With the body contact level information, one from among a given number of categories such as "small", "medium", and "large" is selected according to the strength of the capacitance (the maximum value, for example). Thus, one set of gain data can be acquired from body contact surface information and body contact level information. The correction computing module 142 is able to perform correction according to gain data given by contact surface correction and contact level correction on the basis of the acquired content of the correction computing module. Correction may involve storing given ratio values in the "gain data" of the gain table with respect to values of the receiving antenna gain Grx in the above Equation (1), and using such a ratio value to increase or decrease the original receiving antenna gain (Grx), for example. Correction may also involve directly storing the value of the receiving antenna gain Grx itself in the "gain data" and overwriting it with gain data acquired from the gain table at the time of correction.

Processing Sequence in Embodiment 2

Figure 8:
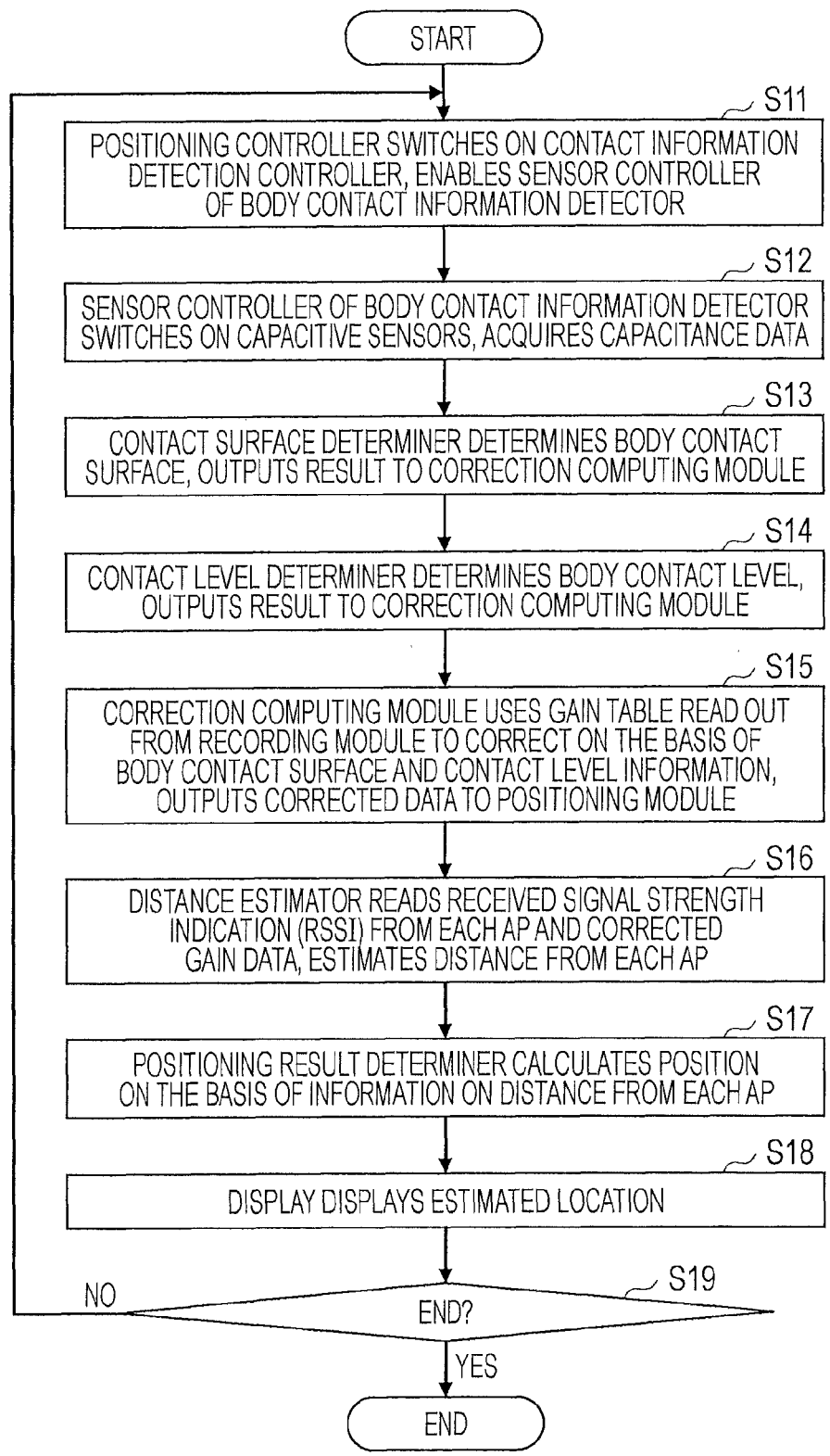
FIG. 8 is a flowchart illustrating an exemplary positioning correction processing sequence in accordance with Embodiment 2.

A correction processing sequence in Embodiment 2 will now be specifically described using a flowchart. FIG. 8 is a flowchart illustrating an exemplary positioning correction processing sequence in Embodiment 2. In the flowchart illustrated in FIG. 8, two capacitive sensors are included and correction is conducted by contact level determination and contact surface determination as an example.

In FIG. 8, the positioning controller 151 switches on the contact information detection controller 141 and enables the sensor controller 121 of the body contact information detector 12 in the case where it is disabled (operation S11). Next, the body contact information detector 12 switches on the back capacitive sensor 122-1 and the front capacitive sensor 122-2, and acquires capacitance data (operation S12).

Next, the contact surface determiner 124 determines the body contact surface and outputs the result to the correction computing module 142 (operation S13). Also, the contact level determiner 123 determines the body contact level and outputs the result to the correction computing module 142 (operation S14).

Next, the correction computing module 142 corrects data read out from the recording module 13 on the basis of body contact surface and contact level information, and outputs corrected data to the positioning module 15 (operation S15).

Next, the distance estimator 152 reads in received signal strength indications (RSSIs) from AP1 to AP3 and the corrected gain data and estimates the distance from each AP1 to AP3 (operation S16). Also, the positioning result determiner 153 calculates and outputs a position on the basis of information regarding the distance from each AP1 to AP3 (operation S17), and displays an estimated location on the screen of the display 16 (operation S18).

At this point, the positioning controller 151 determines whether or not to end the correction positioning process in Embodiment 2 (operation S19), returning to S11 and repeating the processing thereafter in the case of not ending the process (operation S19—No). Meanwhile, the positioning controller 151 ends the positioning correction process in Embodiment 2 in the case of ending the process in the processing of S19 (operation S19—Yes).

Embodiment 3

Next, Embodiment 3 will be described. FIG. 9 illustrates an exemplary schematic configuration of an information processing apparatus in Embodiment 3. The information processing apparatus 50 illustrated in FIG. 9 includes a wireless communication module 11, a body contact information detector 12, a recording module 13, an antenna gain data correcting unit 14, a positioning module 15, a display 16, and an orientation detector 51. However, the above recording module 13 may also be provided inside the antenna gain data correcting unit 14. Also, in Embodiment 3, like reference symbols are given to like elements from Embodiments 1 and 2 discussed earlier, and detailed description thereof is reduced or omitted.

Compared to Embodiments 1 and 2, Embodiment 3 is provided with an orientation detector 51 that detects the direction of the information processing apparatus. In other words, the antenna gain data correcting unit 14 acquires body contact surface information and body contact level information from the body contact information detector 12, while also acquiring information on the orientation of the information processing apparatus 50 (such as the direction and angle, for example) from the orientation detector 51.

Consequently, the antenna gain data correcting unit 14 acquires from the recording module 13 gain data corresponding to the above body contact surface and body contact level information as well as orientation information, and corrects the antenna gain/directionality. Also, the positioning module 15 conducts positioning on the basis of corrected gain data obtained from the antenna gain data correcting unit 14, using received signal strength indications (RSSIs) from AP1 to AP3 obtained from the wireless communication module 11. The positioning module 15 also outputs an estimated location result estimated by trilateration to the display 16, where it is displayed on the screen of the display 16.

Exemplary Block Configuration in Embodiment 3

Next, an exemplary block configuration in Embodiment 3 will be described using a drawing. FIG. 10 illustrates an exemplary block configuration of an information processing apparatus in Embodiment 3. In the description of Embodiment 3 herein, like reference symbols are given to like elements from the above Embodiments 1 and 2, and specific description of such individual elements is reduced or omitted. Also, although the block configuration of Embodiment 3 illustrated in FIG. 10 includes the block configuration of the above Embodiment 2 as the block configuration of the body contact information detector 12, a block configuration corresponding to the above Embodiment 1, for example, is also acceptable.

In the block configuration illustrated in FIG. 10, exemplary, specific block configurations are illustrated for the body contact information detector 12, the antenna gain data correcting unit 14, and the positioning module 15 in the information processing apparatus 10 illustrated in the above FIG. 1, as well as for the orientation detector 51.

The body contact information detector 12 includes a sensor controller 121, a back capacitive sensor 122-1, a front capacitive sensor 122-2, a contact level determiner 123, and a contact surface determiner 124. Also, the antenna gain data correcting unit 14 includes a contact/direction information detection controller 143 and a correction computing module 142. Also, the positioning module 15 includes a positioning controller 151, a distance estimator 152, and a positioning result determiner 153. Also, the orientation detector 51 includes a sensor controller 511, a geomagnetic sensor 512 that acts as an electronic compass, and an orientation determiner 513.

The sensor controller 121 in the body contact information detector 12 controls the switching on/off of the back capacitive sensor 122-1 and the front capacitive sensor 122-2 on the basis of a control signal (Enable/Disable, for example) from the contact/direction information detection controller 143.

The back capacitive sensor 122-1 and the front capacitive sensor 122-2 respectively acquire surrounding capacitance data on the basis of a control signal from the sensor controller 121. The back capacitive sensor 122-1 and the front capacitive sensor 122-2 also output the acquired capacitance data to the contact level determiner 123 and the contact surface determiner 124.

The contact level determiner 123 and the contact surface determiner 124 output body contact level information and body contact surface information to the correction computing module 142, as discussed earlier.

The geomagnetic sensor 512 of the orientation detector 51 acquires geomagnetic data under control by the sensor controller 511, and outputs it to the orientation determiner 513. The orientation determiner 513 determines the orientation (direction, angle, etc.) of the information processing apparatus 50 according to geomagnetic data from the geomagnetic sensor 512, and outputs the result obtained thereby to the correction computing module 142.

The correction computing module 142 computes correction on the basis of body contact surface information and body contact level information obtained from the body contact information detector 12 as well as information on the orientation of the information processing apparatus 50 obtained from the orientation detector 51. At this point, the correction computing module 142 uses a gain table obtained from the recording module 13 to acquire gain correction data corresponding to the information, and corrects the receiving antenna gain (Grx) in the above Equation (1) on the basis of the acquired gain data. The correction computing module 142 also outputs corrected gain data to the distance estimator 152.

The distance estimator 152 estimates distances on the basis of received signal strength indications (RSSIs) from AP1 to AP3 received by the wireless communication module 11 from the receive antenna 21, and outputs the estimated results.

Gain Table in Embodiment 3

Figures 11A, 11B:
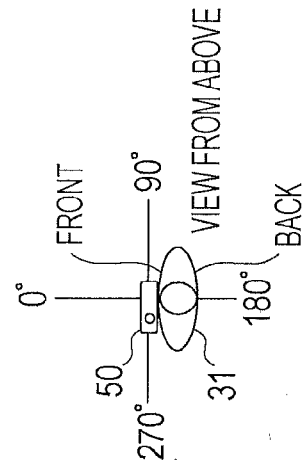
FIGS. 11A and 11B illustrate an exemplary gain table in accordance with Embodiment 3.

An exemplary gain table in Embodiment 3 will now be described. FIGS. 11A and 11B illustrate an exemplary gain table in Embodiment 3. FIG. 11A illustrates the relationship between an information processing apparatus 50 and a body 31, while FIG. 11B illustrates an exemplary gain table corresponding to FIG. 11A. In FIG. 11A, angles are defined with the direction faced by the front of the body 31 being 0°, and direction opposite the body 31 (the back) being 180°. Also, the information processing apparatus 50 determines the contact surface to be the front in the case where the liquid crystal surface is contacting the body, with the contact level increasing with stronger contact (capacitance).

Meanwhile, items in the gain table illustrated in FIG. 11B include "Angle", "Body contact surface information", "Body contact level information", and "Gain data", for example. Herein, angles are set as angles with respect to a specific bearing (e.g., taking due north (0°) as a reference), for example. In other words, gain data is set for individual types of body contact surface information and contact level information at respective angles. Thus, more suitable correction can be conducted according to the orientation of the information processing apparatus 50.

Exemplary Correction Computation by Correction Computing Module 142 in Embodiment 3

Figures 12A, 12B:
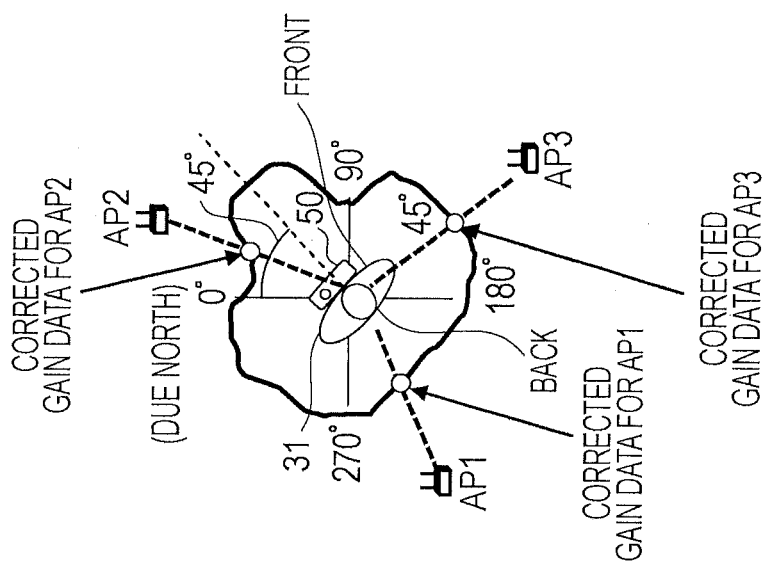
FIGS. 12A and 12B are diagrams for explaining exemplary correction computation of a correction computing module in accordance with Embodiment 3.

Next, exemplary correction computation by the correction computing module 142 in Embodiment 3 will be described using a drawing. FIGS. 12A and 12B are diagrams for explaining exemplary correction computation of a correction computing module in Embodiment 3. FIG. 12A illustrates relative positions of a body 31 and a information processing apparatus 50 in order to explain exemplary correction computation, while FIG. 12B illustrates a gain table after correction by the correction computing module 142.

In the example in FIGS. 12A and 12B herein, data in the gain table pre-recorded in the recording module 13 is shifted by 45° in the case where information on the orientation (direction, angle) of the information processing apparatus indicates "45°" as the angle of the information processing apparatus 50 with respect to due north and the body contact level is "large". In other words, as illustrated in FIG. 12B, a gain table in which every angle from 0° to 359° is offset by 45° is set as the corrected gain table. Consequently, in the case where the angle is 0°, for example, the gain table acquires gain data offset by 45°, i.e. 315° ("G_315_f_l" in FIG. 12B). Similarly, in the case where the angle is 1°, for example, 316° gain data ("G_316_f_l" in FIG. 126) is acquired.

In this way, in Embodiment 3, by correcting gain data recorded in the recording module 13 on the basis of the direction of the information processing apparatus 50 for AP1 to AP3 individually, correction can be conducted more suitably, and suitable trilateration can be realized using gain data corrected for AP1 to AP3.

Positioning Technique of Positioning Module 15 in Embodiment 3

A positioning technique of the positioning module 15 in Embodiment 3 will now be specifically described. In Embodiment 3, trilateration is conducted by way of example. First, radio waves from AP1 to AP3 are received by a device and RSSIs are acquired. Next, the distance d from each AP is computed from the above Equation (1). At this point, Ptx, Gtx, and Grx are calculated with fixed values. Next, a location is estimated by trilateration on the basis of the above computed distances from AP1 to AP3.

In the above process, a rough device location is estimated on the basis of uncorrected gain data, but in Embodiment 3, a suitable device location is estimated on the basis of subsequently corrected gain data.

Specifically, the angles of AP1 to AP3 (the angles with respect to due north, for example) are first computed on the basis of rough device location information computed above. Next, the distances d from AP1 to AP3 are computed from the above Equation (1). At this point, Ptx and Gtx in the above Equation (1) are taken to be preset, fixed values, whereas values computed with gain data corrected for each of AP1 to AP3 discussed earlier are used for Grx. Next, a location is estimated by trilateration on the basis of the distances from respective APs computed above.

Processing Sequence in Embodiment 3

Figure 13:
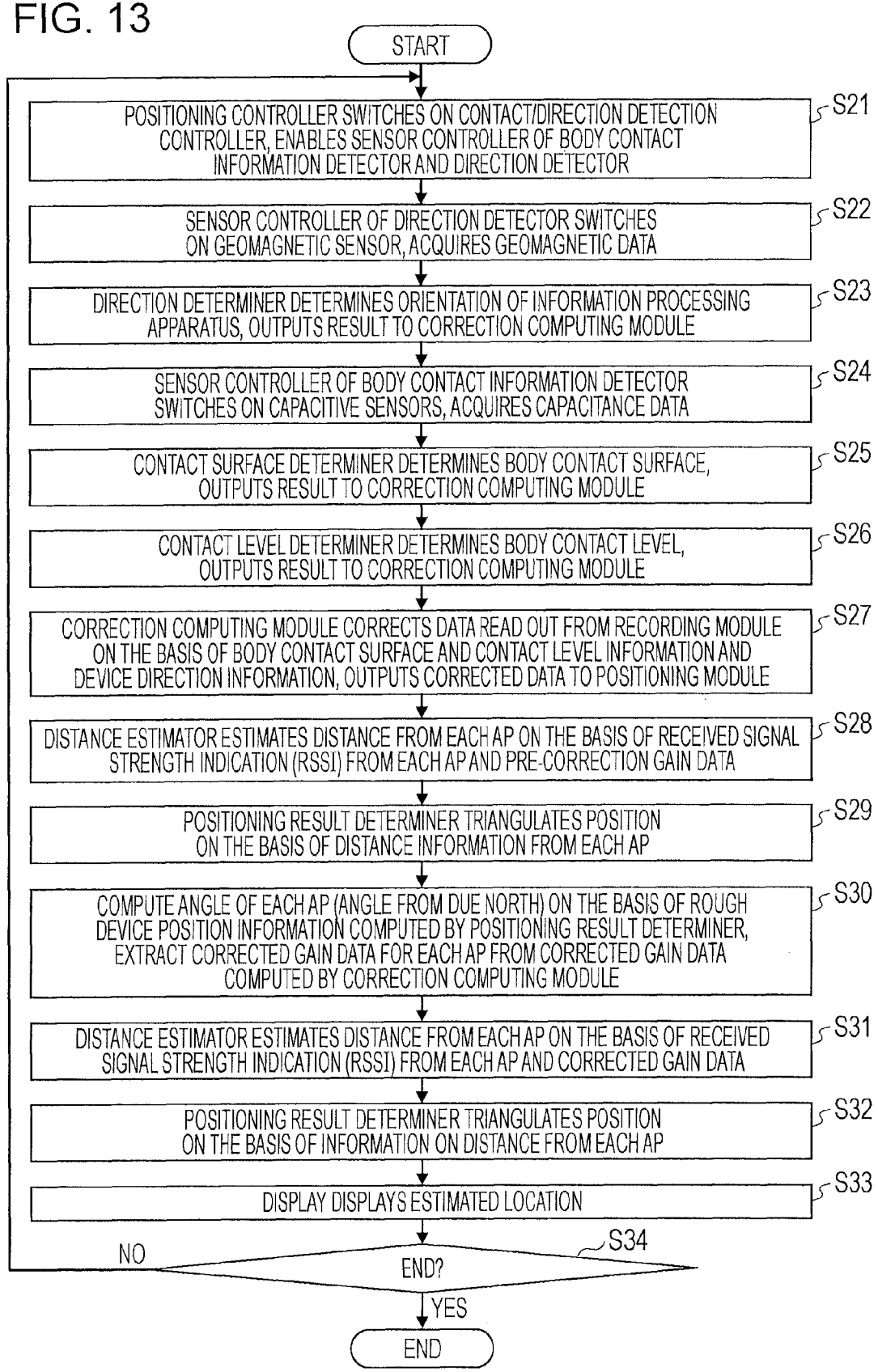
FIG. 13 is a flowchart illustrating an exemplary positioning correction processing sequence in accordance with Embodiment 3.

A correction processing sequence in Embodiment 3 will now be specifically described using a flowchart. FIG. 13 is a flowchart illustrating an exemplary positioning correction processing sequence in Embodiment 3. In the flowchart illustrated in FIG. 13, two capacitive sensors and an additional geomagnetic sensor are included by way of example, and correction is conducted according to body contact level determination results, contact surface determination results, and information therefor.

In FIG. 13, the positioning controller 151 switches on the contact/direction information detection controller 143 to enable the body contact information detector 12 to enable the sensor controllers of the body contact information detector 12 and the orientation detector 51 (operation S21). Next, the sensor controller 511 of the orientation detector 51 switches on the geomagnetic sensor 512 and acquires data (operation S22). Also, the orientation (direction, angle, etc.) of the information processing apparatus 50 is determined by the orientation determiner 513 on the basis of the result obtained from the processing in operation S22, and the obtained results are output to the correction computing module 142 (operation S23).

Also, the sensor controller 121 of the body contact information detector 12 switches on the one or more capacitive sensors (the back capacitive sensor 122-1 and the front capacitive sensor 122-2 in the example in FIG. 10) and acquires data as discussed earlier (operation S24). At this point, after the processing in operation S24 ends, the contact surface determiner 124 determines the body contact surface and outputs the result to the correction computing module 142 (operation S25). Also, the contact level determiner 123 determines the body contact level and outputs the result to the correction computing module 142 (operation S26).

The correction computing module 142 corrects data read out from the recording module 13 on the basis of body contact surface and contact level information as well as device direction information, and outputs the corrected data to the positioning module 15 (operation S27).

Subsequently, the distance estimator 152 corrects the receiving antenna gain using the received signal strength indications (RSSIs) from AP1 to AP3 and uncorrected gain information obtained by operation S27, and estimates the distance from each AP (operation S28). Also, the positioning result determiner 153 calculates a location by trilateration on the basis of information on the distances from AP1 to AP3 (operation S29).

Next, the positioning result determiner 153 computes the angle of each AP (angle with respect to due north) on the basis of the rough device location information thus computed, and extracts gain correction data for each AP from the corrected gain data computed by the correction computing module 142 (operation S30).

Also, the distance estimator 152 estimates the distance from each AP on the basis of received signal strength indications (RSSIs) from AP1 to AP3 and the corrected gain data (operation S31). The positioning result determiner 153 calculates a location by trilateration on the basis of information on the distances from AP1 to AP3 (operation S32), and displays the results on the display 16 (operation S33).

At this point, the positioning controller 151 determines whether or not to end the positioning correction process in Embodiment 3 (operation S34), returning to S21 and repeating the processing thereafter in the case of not ending the process (operation S34—No). Meanwhile, the positioning controller 151 ends the positioning correction process in Embodiment 3 in the case of ending the process in the processing of operation S34 (Yes in operation S34—Yes).

However, the positioning correction processes described in the foregoing embodiments may also be realized as a program executed by a computer. By installing such a program from a server or elsewhere and causing a computer to execute the program, the foregoing positioning correction processes can be realized.

Additionally, it is also possible to realize the foregoing positioning correction processes by recording the program onto a recording medium and causing a computer or mobile device to read the recording medium onto which the program is recorded. Various types of recording media may be used as the recording medium, including recording media that optically, electrically, or magnetically record information, such as with CD-ROMs, flexible disks, and magneto-optical discs, as well as semidielectric body memory that electrically records information, such as with ROM and flash memory. Moreover, the positioning correction processes described in the foregoing embodiments may also be implemented in one or a plurality of integrated circuits.

The foregoing thus describes embodiments in detail, but the disclosed technology is not limited to a specific embodiment, and various alterations and modifications other than the above examples are possible within the scope stated by the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that conducts positioning on the basis of received signal strength indications obtained from access points, comprising:
    a contact information detector that detects contact information between the information processing apparatus and a dielectric body;
    a recording module that stores a gain table including gain data corresponding to obtained contact information;
    a gain data correcting unit that extracts the gain data corresponding to the contact information obtained by the contact information detector from the gain table of the recording module and corrects gain by using the extracted gain data; and
    a positioning module that conducts the positioning by using the gain obtained by the correcting unit and the received signal strength indications.

2. The information processing apparatus according to claim 1, wherein the gain data includes receiving antenna gain data.

3. The information processing apparatus according to claim 2, wherein the contact information detector includes a capacitive sensor that measure capacitance from the dielectric body.

4. The information processing apparatus according to claim 3, further comprising:
a contact level determiner that determines a contact level with the dielectric body on the basis of the capacitance obtained by the capacitive sensor.

5. The information processing apparatus according to claim 4, wherein the gain table includes receiving antenna gain data associated with the contact level.

6. The information processing apparatus according to claim 5, wherein the capacitive sensor is plurally provided at different positions.

7. The information processing apparatus according to claim 6, further comprising:
a contact surface determiner that determines a surface of contact with the dielectric body from differences in the capacitance magnitudes obtained by a plurality of the capacitive sensors.

8. The information processing apparatus according to claim 7, wherein
the gain table includes receiving antenna gain data associated with the contact level and the contact surface.

9. The information processing apparatus according to claim 8, further comprising:
an orientation detector that detects information on the orientation of the information processing apparatus.

10. The information processing apparatus according to claim 9, wherein
the gain table includes receiving antenna gain data associated with the contact level, the contact surface, and the orientation information.

11. The information processing apparatus according to claim 4, wherein the capacitive sensor is plurally provided at different positions.

12. The information processing apparatus according to claim 11, further comprising:
a contact surface determiner that determines a surface of contact with the dielectric body from differences in the capacitance magnitudes obtained by a plurality of the capacitive sensors.

13. The information processing apparatus according to claim 12, wherein the gain table includes receiving antenna gain data associated with the contact level and the contact surface.

14. The information processing apparatus according to claim 13, further comprising:
an orientation detector that detects information on the orientation of the information processing apparatus.

15. The information processing apparatus according to claim 14, wherein the gain table includes receiving antenna gain data associated with the contact level, the contact surface, and the orientation information.

16. A correction method comprising:
detecting contact information between the information processing apparatus and a dielectric body;
storing a gain table including gain data corresponding to obtained contact information;
extracting the gain data corresponding to the contact information obtained by the contact information detector from the gain table of the recording module and corrects gain by using the extracted gain data; and
conducting the positioning by using the gain obtained by the correcting unit and the received signal strength indications.

17. A non-transitory recording medium having recorded thereon a computer-readable correction program causing a computer to execute processing comprising:
detecting contact information between the information processing apparatus and a dielectric body;
storing a gain table including gain data corresponding to obtained contact information;
extracting the gain data corresponding to the contact information obtained by the contact information detector from the gain table of the recording module and corrects gain by using the extracted gain data; and
conducting the positioning by using the gain obtained by the correcting unit and the received signal strength indications.

* * * * *